United States Patent
Conlon

[15] 3,668,490
[45] June 6, 1972

[54] LIGHT POWERED BY INDUCTION OF VARIABLE IMPEDANCE MOTOR

[72] Inventor: William J. Conlon, New Britain, Conn.
[73] Assignee: Dynamics Corporation of America, New York, N.Y.
[22] Filed: Jan. 20, 1971
[21] Appl. No.: 107,906

[52] U.S. Cl. .................. 318/245, 318/305, 240/2.14
[51] Int. Cl. .................. H02k 23/64, D05b 79/00
[58] Field of Search .................. 318/305, 480, 490, 245, 251, 318/252; 240/2.14, 2 MT, 2 VC

[56] References Cited
UNITED STATES PATENTS

| | | |
|---|---|---|
| 3,109,164 | 10/1963 | Happe .................. 318/490 |
| 3,495,082 | 2/1970 | Cook .................. 240/2.14 |
| 2,275,878 | 3/1942 | Allenby .................. 240/2 MT |
| 2,525,588 | 10/1950 | Cameron .................. 240/2 MT |
| 2,671,192 | 3/1954 | Fleming .................. 318/490 |

Primary Examiner—Harold Broome
Assistant Examiner—Thomas Langer
Attorney—Harbaugh & Thomas

[57] ABSTRACT

A universal motor field tapped for speed control is serially connected at one end through the armature to one side of an electrical potential. An operationally interlocked series of ON and OFF switches selectively interconnect the field taps to the other side of the electrical potential and a light bulb bridges said one side of the electrical potential and the other end of the field for substantially constant illumination of a working area at all speeds without need for a separate light switch.

10 Claims, 6 Drawing Figures

PATENTED JUN 6 1972 3,668,490
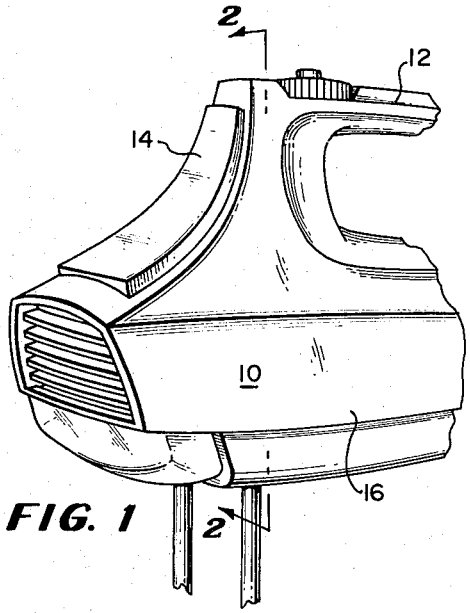
FIG. 1
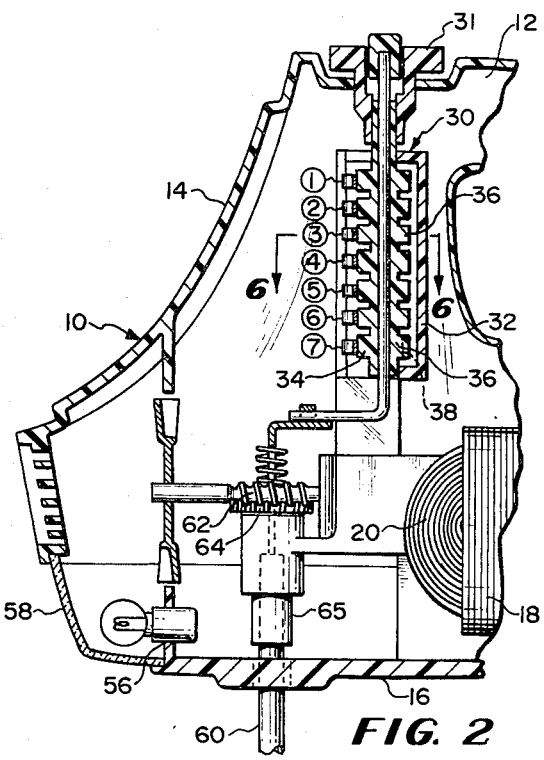
FIG. 2
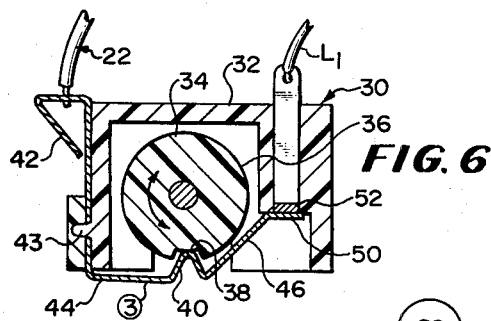
FIG. 6
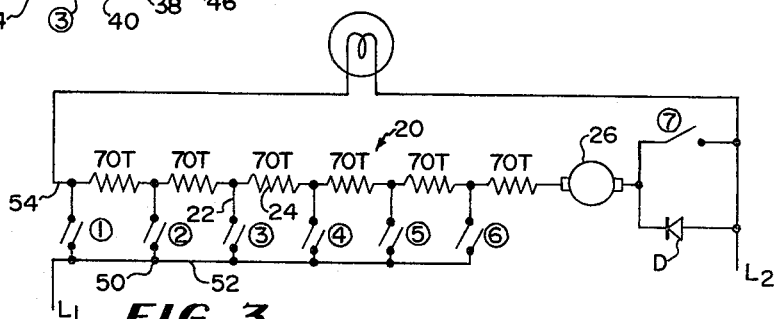
FIG. 3
| LO SPEED | | HI SPEED | |
|---|---|---|---|
| CLOSED SWITCHES | | CLOSED SWITCHES | |
| 1 | 120 V | 1-7 | 120 V |
| 2 | 122 V | 2-7 | 123 V |
| 3 | 123.5 V | 3-7 | 124 V |
| 4 | 124 V | 4-7 | 126.5 V |
| 5 | 125 V | 5-7 | 127.5 V |
| 6 | 126 V | 6-7 | 128.5 V |
$6W = \dfrac{V^2}{R}$, $R = \dfrac{14400}{6W}$, $R = LAMP(2400\,\Omega)$
FIG. 5          FIG. 4
INVENTOR:
WILLIAM J. CONLON
By Harbaugh & Thomas
Attorneys

LIGHT POWERED BY INDUCTION OF VARIABLE IMPEDANCE MOTOR

CROSS REFERENCE

Swank et al, application Ser. No. 26967

BACKGROUND OF THE INVENTION:

In the desire to utilize all speeds possible in the speed selection switch system of multi-speed household appliances, such as food mixers and the like, a problem arises where an appliance working area should be specifically illuminated for the convenience and safety of the user. Generally one of the speeds has to be sacrificed so that a switch can be used to serve as an ON and OFF switch for motor and light, or for the light alone. Otherwise, either a portable house light is used with inconvenience or a lamp is disposed in series with the appliance and objectionably dims with load and speed changes.

SUMMARY OF INVENTION:

In the present invention with a tapped field speed controlled fractional horsepower universal motor, no ON and OFF switch is required for either motor or lamp and no extra switch is required for the lamp itself. Every speed changing switch is connected to a field coil tap and serves as an OFF and ON switch for a particular speed, and, those field coil portions which are not in the power energized path assist inductively in energizing the electrical lamp in combination with the power appearing across the power energized path.

The invention is characterized by a low wattage lamp being constantly energized automatically and at a constant working brilliance for all speeds and loads of multi-speed household appliance while the appliance is in operation.

Other advantages and purposes including economy, conservation of power, and simplicity of structure and operation will become apparent from the following description and drawings.

IN THE DRAWINGS:

FIG. 1 is a perspective view of the front end portion of a food mixer embodying the invention;

FIG. 2 is a sectional view taken on line 2-2 of FIG. 1;

FIG. 3 is a diagrammatical representation of the speed control circuit for 12 different speeds in six of which a seventh switch controls a diode;

FIG. 4 is a chart showing the switch closures and resulting power potential applied on the lamp at all speeds;

FIG. 5 is the simple equation to determine desirable relationship between adequate lamp wattage and the resistance thereof; and FIG. 6 is a section taken on line 6—6 of FIG. 2 illustrating a switch construction.

DESCRIPTION OF THE PREFERRED EMBODIMENT:

Referring now to the drawing and FIG. 1 in further detail, the food mixer embodying the invention has a housing 10 which includes a handle 12 and front pillar 14 to support motor and transmission enclosure 16. The stator 18 of the motor has two poles with a tapped field 20 wound on them (FIG. 3) which in the embodiment illustrated comprises five taps 22 to provide six coils 24 of 70 each of No. 29 gauge wire for an armature of No. 33 gauge wire.

The stator can be U-shaped with a single coil wound on the bight or dual poles can be provided and have a portion of the field coil wound on each of them in which case three coils are physically disposed on each of the two stator poles, and, although thus physically separated on opposite sides of the armature, they cooperate magnetically and the field is connected electrically at one end in series with the armature 26 whose other end has a connection to one side $L_2$ of the source of electrical power which connection may include a diode D.

A rotatable switch 30 carrying a manual dial control 31 accessible at the top of the handle is mounted in the pillar 14.

The switch comprises a housing 32 journalling a rotor 34 driven by the control 31 and preferably has seven circular switch control cams 36. The cams for switches 1–6 coact to energize the six coils for six different motor speeds and the seventh switch 7 switches a diode D in and out of the motor circuit for speed control purposes in combination with the six switches to provide twelve motor speeds. Each of the six cams 36 are provided with switch closing reliefs 38 that are angularly staggered around the rotor so that none overlap circumferentially. This assures that no two of the six switches are closed at the same time and, furthermore, an OFF position or dwell is also provided at which no switches are closed. The relief cam for the diode switch 7 preferably extends circumferentially for 180° of rotation so that the diode is in the circuit for six low speeds and out of the circuit for six high speeds. Thus when the armature is connected serially to the other side of the power line $L_2$ through the rectifier D it provides half-wave power through the field coils and is shorted out by the switch 7 when full wave power is supplied.

Although six switches are illustrated, fewer can be used if a full complement of twelve speeds is not desired, or the diode D need not be provided if six or less number of speeds is designed for, it being appreciated that the effective angular spacing of the cam on the rotor can be varied or rotational limit stops can be interposed where desired.

The switches 1–7 each comprise an armature blade portion and a stationary contact. The armature is formed of a spring blade 44 biased to urge closure of the switch. A terminal portion 42 is embedded in the wall of the housing as positioned on a molded projection 43 prior to the time a retainer bar 45 is sonically welded in place. Each terminal 42 receives a field tap connection 22 and the movable blade portion 46 is formed to provide a cam follower detent 40 cooperating with the relief 38 for actuation. Each blade portion terminates in an electrical contact at 50. All of the contacts 50 of switches 1–6 coact with a common stationary contact member 52 that is connected to the $L_1$ side of the power supply. When all the switches 1–6 are open, the motor is OFF and the closure of any single switch 1–6 energizes those field coil portions that are connected between the closed switch and the armature. This provides the working field for that selected speed as illustrated in FIG. 3.

Within the nose of the housing 10, a lamp 56 is mounted to provide six watts of light through the translucent window 58 located directly above the working area therebelow where the conventional interdigitating beaters 60 will be driven by the worm gear 62 on the armature shaft as disposed between two worm wheels 64 on the beater drive shafts 66. The lamp is connected across the motor circuit from the connection $L_2$ to the switch 1 at the end of the field 20 as at 54.

Assuming that 6 watts of light will be satisfactory illumination of the food mixer working area, and the power potential being 120V A.C. across the source of power $L_1$ and $L_2$ the formula shown in FIG. 5 indicates that the resistance of the lamp to be employed should approximate 2,400 ohms. Then with the food mixer ready for operation at selected speeds the voltage across the lamp will range as shown in the left hand column of FIG. 4 in relation to the closure of the switches 1–6 for LO speeds as when switch 7 is open and the half-wave power potential is applied. It will be observed that electrical potential across the lamp, starting with 120V when switch 1 is closed, increases appreciably to 126V when switch 6 is the switch closed.

When the switches 1–6 are closed with the diode D shunted for HI speeds by closure of switch 7 for full wave electrical potential, the voltage across the lamp 30 follows a similar pattern which ranges slightly higher starting with 120V as shown in the second column of FIG. 4. In both instances the working brilliance of the lamp 30 is substantially constant.

Applicant is unable to fully account for these results because with increased loading the lamp voltage is further increased appreciably such as 132V A.C. with a 200 watt load at high speed with switches 6 and 7 closed.

It can be understood why with switch 1 closed, the lamp voltage across the motor is 120V A.C., and, it will be appreciated that the lamp would brighter quite a bit from the increased current drawn with an increase in motor load if the lamp were to be connected in series therewith, but with a voltage potential that gradually increases to 10 percent higher than line voltage with increase load and speeds is not clearly understood.

There appears to be a resultant effect from two opposing forces, probably three, namely the variations in the back-electromotive force due to armature induction which is a generative effect on the one hand, and the transformer effect upon the other hand in otherwise unused coils in the field portion of the circuit as involved with a high resistance load. Ancillary to the generative and the transformer effects is the changing of the turns ratio in both of these considerations and also the resultant effect of varying the load upon the motor that causes changes in current and speed. As far as the lamp loop circuit is concerned the transformer ratio of primary and secondary turns changes where the ratio increases for higher resultant voltages at higher speeds, but the back E.M.F. also increases to oppose this with the lamp also comprising a voltage lowering load factor.

The resistance of the lamp should be high to limit greatly the reverse positive flow of current from $T_2$ to $T_1$ through the energized coils and the lamp. This flow has the operational effect of a back E.M.F. current in the energized coils which to the extent permitted by the resistance in the lamp is also a factor in the final results.

With a given motor having a tapped field and the wattage known of the lamp desired to be used its working resistance can be prescribed as indicated. If a higher wattage is desired its resistance can also be designated and within the limits of the purposes for illumination under comparable conditions similar operation will exist.

What is claimed is:

1. In a multi-speed fractional horsepower universal motor the combination of a multi-tapped field coil for speed control purposes,
    means connecting one end of the coil in a series circuit with the armature to one side of an A.C. electrical potential,
    a plurality of ON-OFF switches any one of which turns the motor "on" and selectively connects the taps of the field coil to the other side of the electrical potential, and
    electrical light means interconnecting said one side of the electrical potential and the other end of said coil in series through the coil and switches to said other side of the electrical potential.

2. The combination called for in claim 1 including a rectifier connected in series with said field and armature, and means connecting said light means in a circuit parallel to said series circuit to bridge said rectifier.

3. The combination called for in claim 1 including a rectifier connected in series with said field coil and armature between one side of said A.C. electrical potential and one of said switches, and
    switch means interconnecting said one side of the electrical potential and said armature to bridge said rectifier.

4. In a multi-speed fractional horsepower universal motor driven appliance having a working area;
    an electric light supported by said appliance to illuminate the working area,
    A motor stator including a paramagnetic core and a field wound thereon,
    said field including a plurality of serially connected field coils having individual tap leads at the connections that are disposed intermediate the ends of said field,
    armature means magnetically coupled with said stator and serially connected in circuit to one end of said field,
    a plurality of switches separately interconnecting said tap leads to one side of a source of electrical potential and selectively actuated to close and energize field coils in series with one another,
    means for connecting one end of said circuit to the other side of a source of electrical potential, and
    means connecting said light between said other end of the circuit and the other end of said field in series through non-energized field coils and actuated switch to said other side of the electrical potential.

5. The combination called for in claim 4 including a rectifier connected in series with said field and armature means, and
    means connecting said light means in a circuit parallel to said series circuit to bridge said rectifier.

6. The combination called for in claim 4 including a rectifier connected in series with said field coil and armature between one side of said A.C. electrical potential and one of said switches, and
    switch means interconnecting said one side of the electrical potential and said armature to bridge said rectifier.

7. In a multi speed fractional horsepower universal motor driven appliance having a working area,
    a low wattage electric light supported by said appliance to illuminate the working area,
    a motor stator including a paramagnetic core and field wound thereon,
    said field including a plurality of serially connected field coils having individual tap leads at the interconnections intermediate the ends of said field,
    a multi-switch having contact means and a plurality of movable contacts connected to said tap leads and selectively actuated to close one at a time,
    armature means magnetically coupled with said stator and serially connected in circuit to one end of said field,
    means for connecting one end of said circuit to one side of a source of A.C. electrical potential,
    means connecting said contact means to the other side of said source, and
    means connecting said light between said one end of the circuit and the other end of said field in series through the field coils, their interconnections and the selectively actuated contact to said other side of said source.

8. The combination called for in claim 7 including a rectifier connected in series in said circuit.

9. The combination called for in claim 8 including a switch shunting said rectifier with the closure of said movable contacts.

10. In a multi speed fractional horsepower universal motor driven appliance having a working area,
    an electric light supported by said appliance to illuminate the working area,
    a motor stator including a paramagnetic core and a field wound thereon,
    said field including a plurality of serially connected field coils having individual tap leads at the connections that are disposed intermediate the ends of said field,
    switch means having a common contact and a plurality of movable contacts connected to said tap leads and selectively actuated to engage said common contact one at a time,
    armature means magnetically coupled with said stator and serially connected in circuit to one end of said field,
    means for connecting one end of said circuit to one side of a source of electrical potential,
    means connecting said common contact to the other side of said source, and
    means connecting said light between said one end of the circuit and said other side of said source through the other end of said field and said movable contacts.

* * * * *